(12) United States Patent
Kubitza et al.

(10) Patent No.: US 11,046,237 B2
(45) Date of Patent: Jun. 29, 2021

(54) METHOD AND DEVICE FOR CALCULATING ILLUMINANCE SETTING VALUES FOR LIGHT SOURCES OF A HEADLAMP FROM A LIGHT DISTRIBUTION THAT IS TO BE SET

(71) Applicant: Hella GmbH & Co. KGaA, Lippstadt (DE)

(72) Inventors: Boris Kubitza, Möhnesee-Körbecke (DE); Martin Plümpe, Lippstadt (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/688,011

(22) Filed: Nov. 19, 2019

(65) Prior Publication Data

US 2020/0156529 A1    May 21, 2020

(30) Foreign Application Priority Data

Nov. 21, 2018    (DE) .......................... 102018129250.3

(51) Int. Cl.
*B60Q 1/14*    (2006.01)
*G01J 1/42*    (2006.01)
*G01J 1/02*    (2006.01)

(52) U.S. Cl.
CPC .......... *B60Q 1/1415* (2013.01); *G01J 1/0228* (2013.01); *G01J 1/4257* (2013.01); *B60Q 2300/054* (2013.01)

(58) Field of Classification Search
CPC ............ B60Q 1/1415; B60Q 2300/054; B60Q 2300/056; B60Q 2300/41; B60Q 2300/42; B60Q 2300/43; G01J 1/0228; G01J 1/4257

See application file for complete search history.

(56) References Cited

U.S. PATENT DOCUMENTS

| | | | | |
|---|---|---|---|---|
| 9,894,733 | B1 * | 2/2018 | Buthker | H05B 45/48 |
| 2005/0275562 | A1 * | 12/2005 | Watanabe | B60Q 1/18 |
| | | | | 340/933 |
| 2018/0297511 | A1 * | 10/2018 | Park | B60Q 1/143 |
| 2020/0003384 | A1 * | 1/2020 | Rice | F21S 41/663 |

FOREIGN PATENT DOCUMENTS

| | | |
|---|---|---|
| DE | 102014108239 A1 | 12/2015 |
| DE | 102016122499 A1 | 5/2018 |

\* cited by examiner

*Primary Examiner* — Henry Luong
(74) *Attorney, Agent, or Firm* — Husch Blackwell LLP

(57) ABSTRACT

A method is provided for calculating illumination setting values for light sources of a headlamp from a light distribution that is to be set. First, the light distribution that is to be set is read in. Then, the illuminance target values for pixels of an illumination area are calculated from the light distribution that is to be set, which are to be achieved by setting the light sources of the headlamp in order to set the read-in light distribution. Finally, the illuminance setting values for the light sources are calculated from the target values. Further, at least one illuminance setting value to which this light source is set is calculated iteratively for each light source of the headlamp.

6 Claims, 3 Drawing Sheets

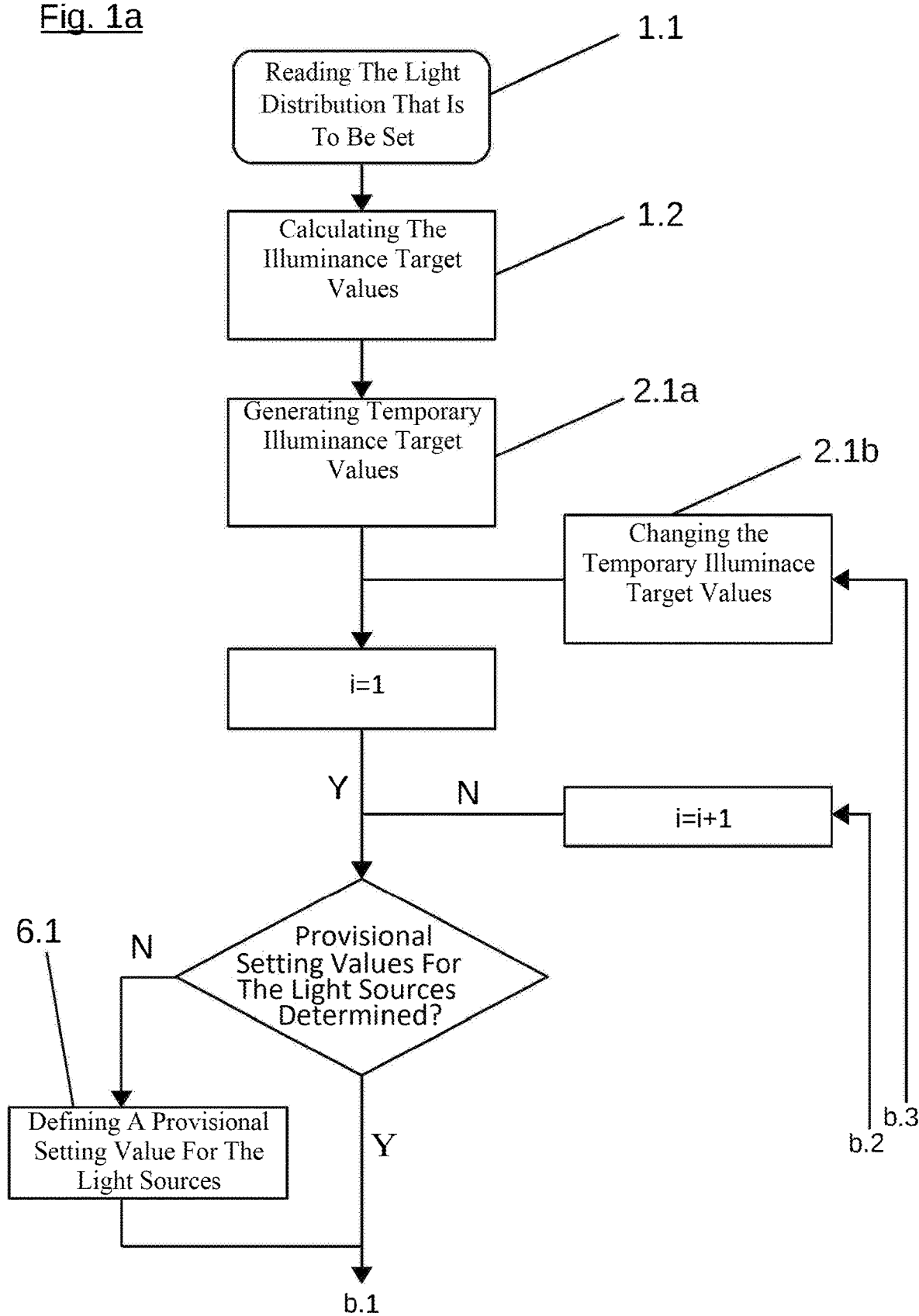

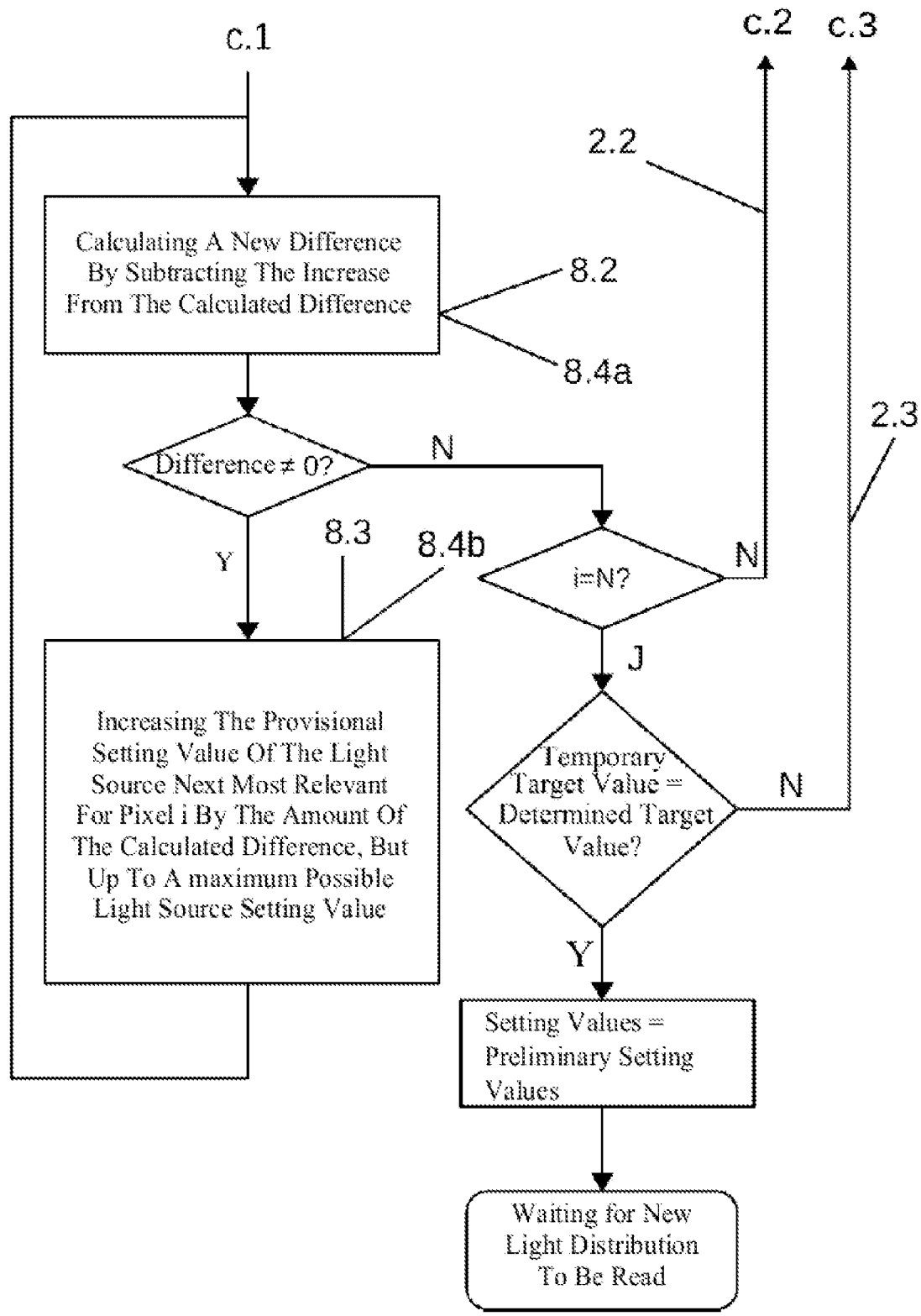

METHOD AND DEVICE FOR CALCULATING ILLUMINANCE SETTING VALUES FOR LIGHT SOURCES OF A HEADLAMP FROM A LIGHT DISTRIBUTION THAT IS TO BE SET

CROSS REFERENCE

This application claims priority to German Patent Application 10 2018 129250.3, filed Nov. 21, 2017, the entirety of which is hereby incorporated by reference.

FIELD OF THE INVENTION

The invention concerns a method and a device for calculating illumination setting values for light sources of a headlamp from a light distribution that is to be set.

BACKGROUND

Modern vehicles are increasingly equipped with headlamps that have a variety of light sources. These light sources can be very small and can be built into integrated electrical circuits. It is possible for several tens of thousands of light sources to be arranged on a surface the size of a fingernail. Generally speaking, the light sources are LEDs. However, it is also possible to set up headlamps with other light sources. The headlamp may be a matrix headlamp which sees the light sources arranged in a matrix.

These headlamps are implemented as front headlamps in vehicles. Front headlamps are often designed according to the current state of the art in such a way that they can be used to set different light distributions, for example high beam or low beam light distributions. Modifying high beam in particular for the purpose of removing glare, for example for other road users, is known. With conventional headlamps that have only one light source, this is often achieved by means of screens, rollers or by swiveling the headlamps. For headlamps, this can be achieved by dimming one or more light sources.

Changing from one light distribution to another light distribution and modifying a light distribution can be achieved with a headlamp by dimming one or more of the headlamp's light sources. By dimming, an illumination area can be illuminated in such a way that there is a lighter and darker area.

Controlling the individual light sources in order to achieve brighter and darker areas in an illumination area, i.e. a certain light distribution in the illumination area, is not trivial, as the light from several light sources overlaps at one point of the illumination area. A change to setting the light source usually results in a change to the illuminance at different points of the illumination area.

In order to illuminate all points of the illumination area with a minimum illuminance, it is often necessary to illuminate some or many points of the illumination area more than necessary just so that another point, for example a neighboring point, is illuminated with the minimum illuminance. All in all, this results in stronger illumination than necessary and causes increased energy consumption.

Therefore, a concern of the invention is to find a method and a device with which a light source setting is possible, wherein points of an illumination area are not illuminated too strongly as far as possible.

Since traffic situations in which vehicles may find themselves can change with high dynamics, it is necessary to be able to quickly change light distributions that have to be set at the headlamps of these vehicles. The light sources of a headlamp must therefore be set rapidly.

This makes it necessary to quickly find the setting values to which the headlamp light sources have to be set. This may still be an easy problem to solve on a few light sources, but, for headlamps with several tens of thousands of light sources, the inventors were faced with a challenge due to the time required for the calculation.

SUMMARY OF THE INVENTION

The invention was therefore based on the task of proposing a method and a device for calculating illuminance setting values for light sources of a headlamp from a light distribution that is to be set, with which it is possible to quickly calculate the setting values without points in the illumination area being illuminated a lot more than necessary.

The following steps are carried out in a method according to the invention:

1.1) reading in the light distribution that is to be set,
1.2) calculating the illuminance target values for pixels of an illumination area from the light distribution that is to be set, which are to be achieved by setting the light sources of the headlamp in order to set the read-in light distribution,
1.3) calculating the illuminance setting values for the light sources from the target values, wherein at least one illuminance setting value to which this light source is set is calculated iteratively for each light source of the headlamp.

Particularly the iteration included in step 1.3) allows the setting values to be calculated quickly, with which it is possible to obtain the desired light distribution for illuminating of the illumination area without having to illuminate many pixels of the illumination area unnecessarily strongly, meaning that the energy consumption for illuminating the illumination area can be kept low.

In order to optimize the computing time, the quantity of illuminance target values can be reduced, especially if the illumination areas of the light sources are much larger than the pixel size. The light distribution that is to be set can then be divided into segments. The number or size of the segments depends on the light distribution of the individual light sources. The segment size must be selected so that the light distribution within a segment is approximately homogeneous. Within a segment, the brightest illuminance target value is adopted to act as the target value for the segment in the amount of the illuminance target values for the pixels of the illumination area.

It is known how to reduce the illuminance to remove glare for other road users or to avoid glare to the driver of the vehicle in question by reflections in certain areas of the road situation that is to be illuminated by the headlamp. This can be done by placing screens behind the headlamp (e.g. mechanical screens, LC display, etc.). If such screens are not available, glare avoidance can be achieved by setting the headlamp accordingly. Then the glare-free areas must be taken into account separately when setting the illuminance of the light sources. For this purpose, a maximum illuminance value is defined for each pixel in the glare-free area of the traffic situation. This can then be used to create a list of maximum values for the maximum illuminance of each light source, since it is known what luminous intensity contribution each light source delivers for each pixel.

When calculating the setting values according to step 1.3, the following steps can be carried out:

2.1) defining temporary target values from the target values or, if temporary target values have already been defined, changing the temporary target values, 2.2) for each pixel i of the illumination area, successively calculating provisional setting values for each light source, the setting of which achieves the temporary target values for pixel i, and 2.3) repeating steps 2.1) and 2.2) until modified provisional setting values are calculated for each light source, which will achieve the target values corresponding to the target values calculated in step 1.2).

A special feature of this further development of the method according to the invention is that it does not attempt to determine the setting values for the light source offhand in such a way that the illuminance target values are achieved in the individual pixels of the illumination area with these setting values for the light sources. Rather, setting values are first calculated in order to achieve temporary target values for the illuminance of the pixels. These temporary target values are then iteratively approximated to the calculated target values after they have been reached using the selected setting values. This iterative approximation to the target values makes it possible to gradually change the setting values for the light sources in order to avoid the effects of a large change to a light source setting value on the illuminance of many pixels.

Defining the temporary target values can be defining reduced target values. The reduction can be for each pixel by an individual percentage value or for all pixels by the same percentage value.

For an individual reduction, the reduction is preferably chosen so that the temporary target value is not greater than the illuminance contribution made by the light source most relevant to the pixel. If the same reduction is selected for all target values, this is preferably not greater than the average illuminance contribution made by the light sources most relevant for the pixels over all pixels.

The temporary target values can be approximated in the course of the iteration with an equidistant increment or a decreasing increment. A decreasing increment can be advantageous for calculating better setting values for the light sources.

The following steps can be carried out in a method according to the invention when calculating the provisional setting values, including the changed provisional setting values in step 2.2):

6.1) defining a provisional setting value for the light sources as long as no provisional setting value has already been defined or determined, 6.2) calculating an illuminance at a pixel i from contributions to the illuminance of the light sources for illuminating the pixel i when setting the preliminary setting values at those light sources, 6.3) calculating a difference from the calculated illuminance for pixel i and the reduced target value or increased reduced target value for the same pixel i, 6.4) increasing the provisional setting values for the light sources by the calculated difference.

Steps 6.1 to 6.4 are also special further development of the invention. Increasing the setting values by a maximum of the difference between the calculated illuminance for pixel i and the temporary target value prevents the temporary target value for the pixel that is being increased from being exceeded. However, the temporary target value can be exceeded by a setting value of a light source that contributes to this pixel being further increased when considering another, preferably a neighboring, pixel and the temporary reduced target value being exceeded. Since, however, the increase is embedded in the iterative increase of the temporary target values, in the end, the calculated target values are at most slightly exceeded. By the way, exceeding the target values can be further reduced by always looking at the pixels that have to have the highest illuminance first and firstly increasing the setting values in order reach the calculated target values for these pixels.

The provisional setting values defined in step 6.1) may be defined uniformly for all light sources or individually for each light source. With a method according to the invention, the provisional setting values can be set to 0% of the maximum possible light source setting values in step 6.1).

The following procedure can be used as per a method according to the invention when increasing the provisional setting values for the light sources by the calculated difference according to step 6.4) depending on the relevance of the light sources for pixel i:

8.1) increasing the provisional setting value of the light source most relevant for pixel i by the amount of the calculated difference, but up to a maximum possible light source setting value, 8.2) calculating a new difference by subtracting the increase from the calculated difference if the new difference is not equal to zero, 8.3) increasing the provisional setting value of the light source next most relevant for pixel i by the amount of the calculated difference, but up to a maximum possible light source setting value, 8.4) repeating steps 8.2 and 8.3 until the difference is zero.

For this, the maximum possible setting value is the maximum setting value technically possible, which is possible due to the technical characteristics of the headlamp, in particular the light source. However, the maximum possible setting value may also be the value that was defined as the maximum possible setting value to prevent glare and that is usually smaller than the maximum technically-possible setting value for the illuminance of the light source.

The most relevant light source for pixel i can be the light source that makes the greatest contribution to the illuminance of pixel i. The next relevant light source for the illumination of pixel i is the light source that provides the second largest contribution to the illuminance of pixel i.

As per a method according to the invention, a sequence of light sources for the illuminance in the pixels can be determined and stored in advance.

In order to carry out a method according to the invention, it is necessary to determine, either before carrying out the method or at the beginning of the method, how the light from each light source of the headlamp is allocated to the pixels of the illumination area. The illumination area that this calculation is based on may be a surface that is 25 m away from the headlamp and that is located perpendicular to a central axis of the light emitted from the headlamp.

For the method according to the invention, it can be advantageous in step 2.1), when calculating the provisional setting values for each light source, to proceed with the pixels in a sequence, which arises from a descending sequence of the amounts of the temporary target values of the pixels. This also avoids setting values that lead to illuminance levels that are higher than the calculated target values.

The task underlying the invention is further solved by a device for calculating illuminance setting values for light sources of a headlamp from a light distribution that is to be set, wherein the device is arranged for reading in the light distribution that is to be set, calculating the illuminance target values for pixels of an illumination area from the light distribution that is to be set, which are to be achieved by setting the light sources of the headlamp in order to set the read-in light distribution, calculating the illuminance setting values for the light sources from the target values, wherein at least one illuminance setting value to which this light source is set is calculated iteratively for each light source of the headlamp.

The device may have an interface for reading in the light distribution that is to be set and for providing the determined setting values for the illuminance levels. The device may also have a memory which stores the illuminance achieved by each light source in each pixel of the illumination area when setting a defined setting value.

BRIEF DESCRIPTION OF THE DRAWINGS

Reference is now made more particularly to the drawings, which illustrate the best presently known mode of carrying out the invention and wherein similar reference characters indicate the same parts throughout the views.

FIGS. 1a, 1b, and 1c illustrate a flowchart of a method according to the invention.

DETAILED DESCRIPTION OF THE DRAWINGS

Figure 1B:
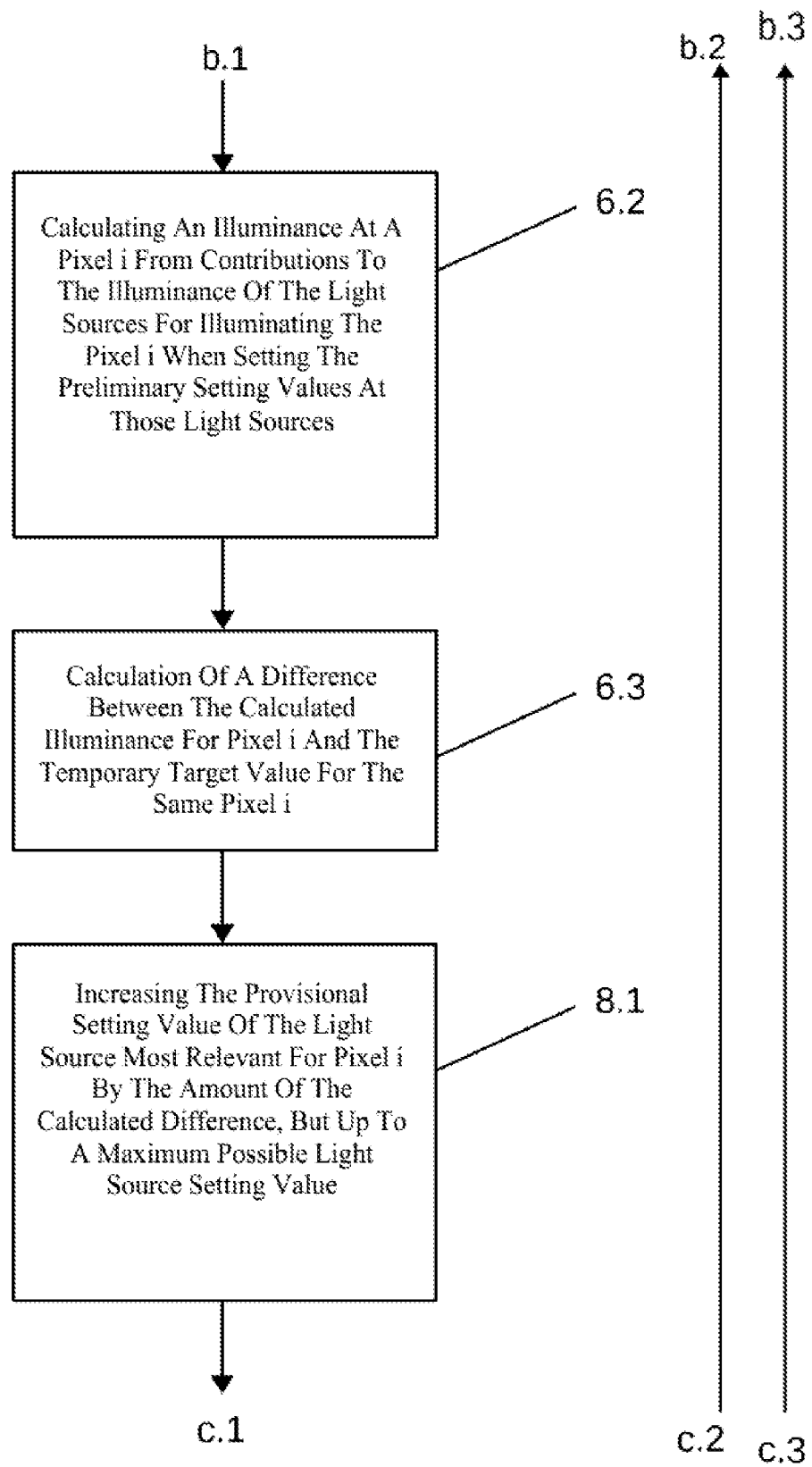

The light distribution to be set is read in at the beginning of the procedure according to the invention shown in FIGS. 1a to 1b (step 1.1). From the light distribution that is read in, an illuminance target value is calculated for every pixel i of a light image that is, according to the light distribution, to be set to a in 25 m from the headlamp that is to be set (step 1.2). It is therefore known what illuminance has to be set at each pixel of the light image on a wall positioned 25 m from the headlamp in order to achieve the desired light distribution. By definition, the light image has a number of N pixels.

Various auxiliary variables are generated for the purpose of achieving these illuminance target values. Temporary illuminance target values are one of these auxiliary variables (step 2.1a). In the case of the method shown in the FIGURE, temporary illuminance target values that are smaller than the determined illuminance target values are selected. As a further auxiliary variable, preliminary setting values, to which the light sources of a headlamp according to the invention would have to be set in order to achieve these temporary illuminance target values, are first sought.

Since it is determined beforehand what contribution each individual light source makes to the illuminance in a pixel i of the light image, it is possible to calculate how the setting of each individual light source affects the illuminance in the pixels i of the light image.

To access the method example that is described in FIGS. 1a to 1c and is in accordance with the invention, setting values of 0% of the maximum illuminance of each light source is selected for each light source of the headlamp (step 6.1).

For a first pixel i=1, it is then calculated which illuminance arises for the pixel i if the selected preliminary setting values were set at the light sources of the headlamp (step 6.2). The illuminance that is calculated in this way for the pixel i is compared with the temporary illuminance target value for the same pixel i which forms a difference between the calculated illuminance and the temporary illuminance target value (step 6.3).

Following the example shown in FIGS. 1a to 1c, the temporary setting value of the headlamp's light source most relevant for illuminating for the pixel i is now increased. In order to do this, a sequence must be determined in advance which specifies the light sources in descending order that contribute to illuminating the pixel i (step 8.1). The increase is by the amount of the calculated difference, but only up to the maximum possible setting value that the light source can be set to (100%).

The increase is then subtracted from the difference that was previously calculated, resulting in a new difference. As before, the difference still indicates which illuminance contribution is missing in the pixel i to reach the temporary illuminance target value (step 8.2). If the difference then determined is not equal to zero, a further illuminance contribution from a light source must be found in order to achieve the temporary illuminance target value.

This missing illuminance contribution is first sought at the next most relevant light source for the pixel i. The next most relevant light source for pixel i is increased by the amount of the calculated difference, but up to the maximum illuminance that this next most relevant light source can provide for the pixel i (step 8.3). According to step 8.2, the increase is subtracted from the previous difference to determine what the difference is after the illuminance of the set light source is increased. If the contribution of this set light source is sufficient, the difference is zero and the setting values for the light sources to achieve the temporary illuminance target value for pixel i are reached. If the difference is not zero, the next most relevant light source, i.e. the third light source, must be set in order in the same way as the first and second light sources. Steps 8.2 and 8.3 are performed until the difference is zero.

If the difference is zero, the preliminary setting values for the light sources are sought, with which the temporary illuminance target value of the next pixel i=i+1 can be reached. To determine these provisional setting values, steps 6.2, 6.3, 8.1, 8.2 and 8.3 are repeated.

Repeating these steps may mean that temporary setting values of light sources that have just been set for one of the pixels are changed. If necessary, the setting values are increased, which means that the pixels for whose illumination the preliminary setting values of the light sources were found have an excessively high illuminance. By skillfully selecting an initial value for the temporary illuminance target values and by skillfully selecting the increments for increasing the temporary illuminance target values, an excessive increase above the desired illuminance can be avoided.

If provisional setting values have then been found for all pixels i with which the temporary illuminance target values of these pixels i can be achieved, the temporary illuminance target values are increased. A further iteration seeks the preliminary setting values that must be set at the light sources in order to set these new temporary illuminance target values at the pixels i. These new provisional setting values are calculated in the way already described.

These iterations are continued until the temporary illuminance target values match the determined illuminance target values. The preliminary setting values that have then been found are adopted as setting values, which are delivered to the headlamps in order to set the light sources of the headlamp accordingly.

We claim:

1. A method for calculating illuminance setting values for light sources of a headlamp from a light distribution that is to be set, the method comprising the following steps:

reading in the light distribution that is to be set;

calculating illuminance target values for pixels of an illumination area from the light distribution that is to be set, which are to be achieved by setting the light sources of the headlamp in order to set the read-in light distribution; and calculating the illuminance setting values for the light sources from the illuminance target values, wherein at least one of the illuminance setting values to which a light source is set is calculated iteratively for each of the light sources of the headlamp, wherein the following steps are carried out when calculating the illuminance setting values:

repeating the following steps until modified provisional setting values are calculated for said each of the light sources, which will achieve the illuminance target values:

one of: defining temporary target values from the illuminance target values when the temporary target values have not already been defined, and changing the temporary target values when the temporary target values have already been defined, for each pixel of the illumination area, successively calculating the modified provisional setting values for said each of the light sources in order to achieve the temporary target values for said pixel;

wherein the following steps are carried out when calculating the modified provisional setting values for said each of the light sources:

defining the modified provisional setting values for the light sources, as long as no modified provisional setting value has already been defined or determined;

calculating an illuminance at said each pixel from contributions to the illuminance of the light sources for illuminating the pixel when setting preliminary setting values to the light sources;

calculating a difference from the calculated illuminance for said pixel and the temporary target values for said pixel; and increasing the modified provisional setting values for the light sources by the calculated difference.

2. The method according to claim 1, wherein the step of defining the temporary target values includes at least one of reducing the illuminance target values for said each pixel by an individual percentage value, or reducing the illuminance target values for all pixels by a same percentage value.

3. The method according to claim 2, wherein the reduction of the illuminance target values is selected in such a way that the temporary target value resulting from the reduction of the illuminance target values is not greater than a contribution of the light sources most relevant to the pixel or greater than an average contribution of the light sources most relevant to the pixels, respectively.

4. The method according to claim 1, wherein the temporary target values are approximated to the calculated illuminance target values with an equidistant increment or a reducing increment.

5. The method according to claim 1, wherein the modified provisional setting values are set to 0% of a maximum possible light source setting values in the step of defining the modified provisional setting values for the light sources.

6. The method according to claim 1, wherein increasing the modified provisional setting values for the light sources by the calculated difference is approached as follows depending on the light sources for the pixel:

increasing the modified provisional setting value of the light source most relevant for the pixel by an amount of the calculated difference, but up to a maximum possible light source setting value; and repeating the following two steps until the calculated difference is zero:

calculating a new difference by subtracting the increase from the calculated difference;

when the new difference is not equal to zero, increasing the modified provisional setting value of the light source that is next most relevant to the pixel by the calculated difference amount, but up to the maximum possible light source setting value.

* * * * *